Dec. 19, 1950   J. M. McCORMICK   2,534,523
APPARATUS FOR SHAPING STRUCTURAL GLASS
Filed Jan. 19, 1948   3 Sheets-Sheet 1
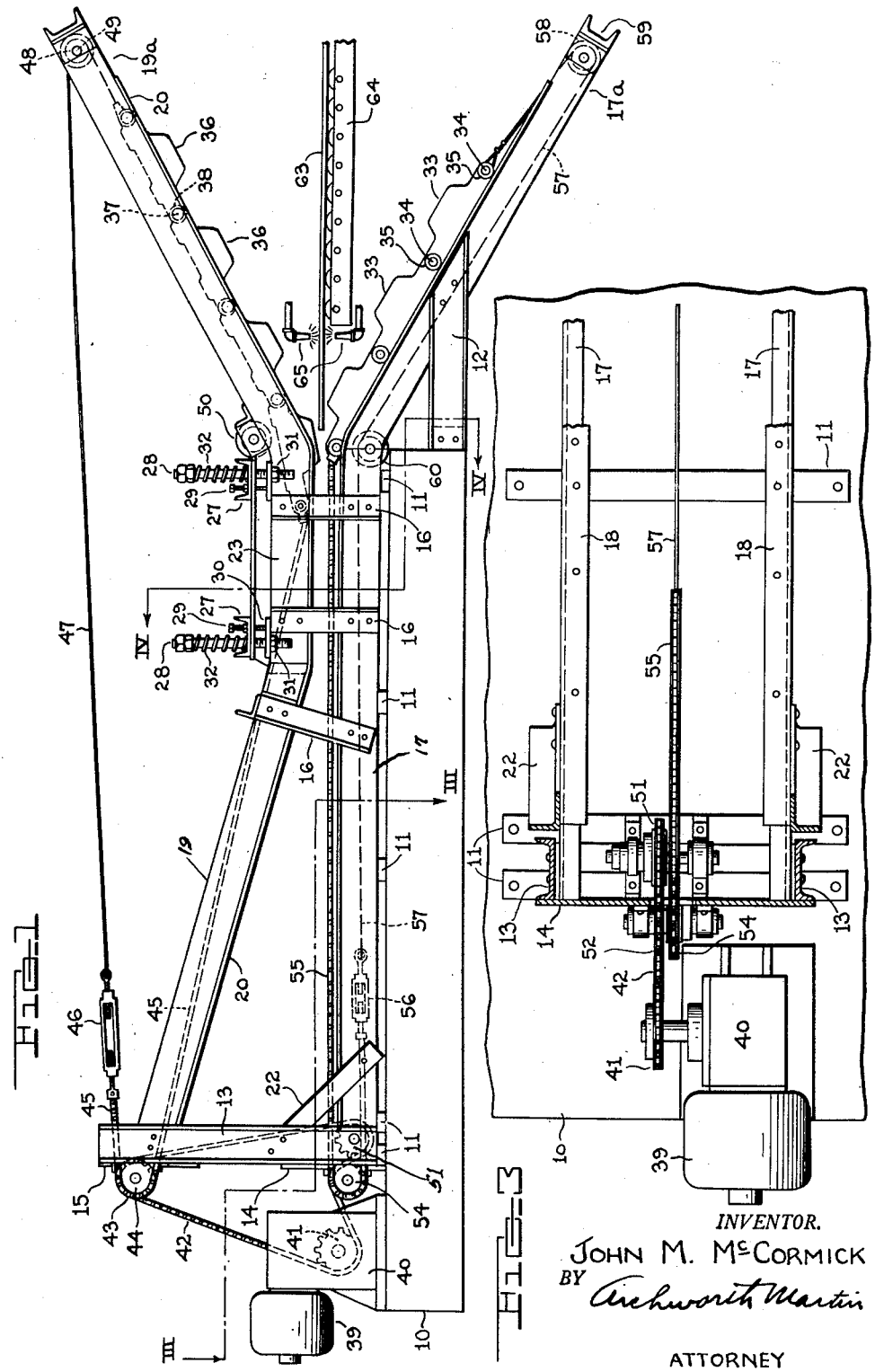
INVENTOR.
JOHN M. McCORMICK
BY Archworth Martin
ATTORNEY Dec. 19, 1950 J. M. McCORMICK 2,534,523
APPARATUS FOR SHAPING STRUCTURAL GLASS
Filed Jan. 19, 1948 3 Sheets-Sheet 2
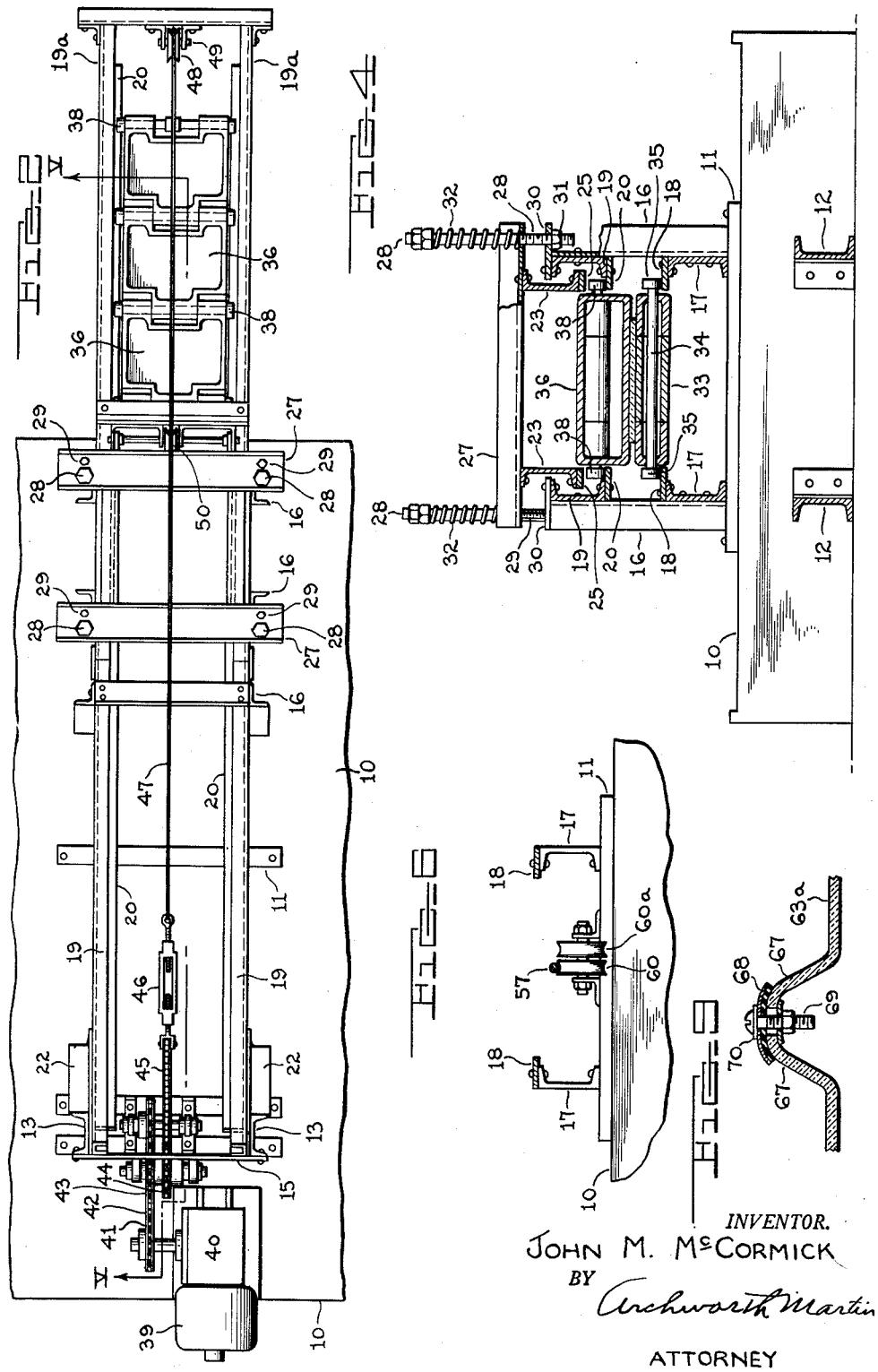
INVENTOR.
JOHN M. McCORMICK
BY Archworth Martin
ATTORNEY Dec. 19, 1950     J. M. McCORMICK     2,534,523
APPARATUS FOR SHAPING STRUCTURAL GLASS
Filed Jan. 19, 1948     3 Sheets-Sheet 3
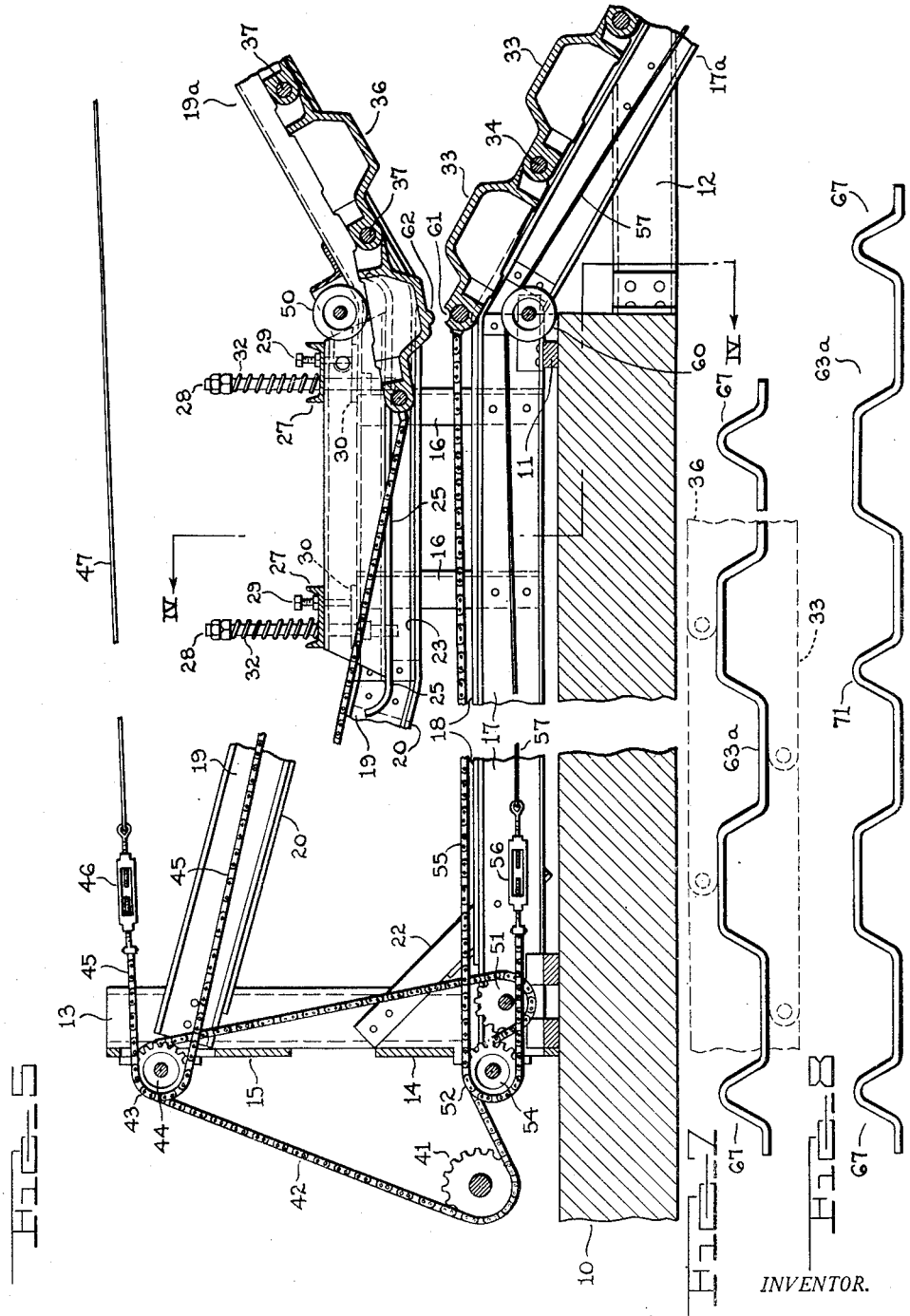
INVENTOR.
BY JOHN M. McCORMICK
ATTORNEY Patented Dec. 19, 1950

2,534,523

UNITED STATES PATENT OFFICE 2,534,523

APPARATUS FOR SHAPING STRUCTURAL GLASS

John M. McCormick, Butler, Pa., assignor to Frank W. Preston, Butler, Pa.

Application January 19, 1948, Serial No. 3,013

3 Claims. (Cl. 49—7)

My invention relates to forming structural shapes and the like from sheet glass which has been heated to a plastic condition, or to the forming of such shapes from other plastic materials such as clay. The invention is herein shown and described as employed in the shaping of sheet glass to crenelated form.

One object of my invention is to provide shaping apparatus of such form that crenels or other contours of generally channel-shape can be formed in sheets of plastic material such as heated glass, with a minimum of sliding movement of the glass on the pressing ribs and with a minimum of stretching of the glass.

Another object of my invention is to provide apparatus wherein the crenel-forming ribs are moved in such paths at opposite sides of a sheet being operated upon, that the glass-contacting surfaces of the shaping ribs have full width engagement with the glass (in the direction longitudinally of the sheet), during the major portion of the bending operation, such broad surface engagement with the glass resulting in distribution of the pressure over a broad surface instead of progressively on narrow transverse lines of contact with the glass, thus avoiding cracks or checks that would be formed by excessive localized chilling.

Briefly stated, the apparatus comprises an intermeshing pair of opposedly-mounted crenel-chains, forming substantially continuous surfaces of cast-iron or the like, but each chain comprising flexible or pivotally connected links. The two chains are synchronized and drawn along together as the glass is fed to them. The lower "chain" before receiving the glass is preferably depressed and then rises to a horizontal plane to receive the glass, and continues in this horizontal plane thereafter. The upper chain is initially raised and descends to a horizontal plane to force the glass to crenelated shape against the lower chain, and remains in contact with the glass long enough to insure that there is always at least one "link" in contact with the glass, so long as the forming process continues, and then rises out of engagement with the glass.

In the accompanying drawings, Figure 1 is a side elevational view of the apparatus; Fig. 2 is a plan view thereof; Fig. 3 is a view taken on the line III—III of Fig. 1; Fig. 4 is an enlarged view taken on the line IV—IV of Fig. 1 but with the presser members in an advanced position; Fig. 5 is an enlarged view taken on the line V—V of Fig. 2, but showing the leading bending elements of slightly modified form; Fig. 6 is a cross sectional view through a portion of the structure of Fig. 1; Fig. 7 is a view showing a panel of glass that is formed by the apparatus of the other figures; Fig. 8 shows a panel of a somewhat different shape than in Fig. 7, and Fig. 9 shows how panels shaped as in Fig. 8 can be joined in a roof or wall.

The apparatus is mounted on a base 10 to which cross strips 11 are secured, and brace bars 12 are secured to and project from one end of the machine. A pair of uprights 13 are secured at their lower ends to the base frame and are connected to one another by horizontally-extending tie plates 14 and 15. Shorter upright members 16 are secured at their lower ends to the base frame and have longitudinally-extending channels 17 secured thereto, the channels serving as supports for track rails 18. A second pair of channels 19 is secured to the column or uprights 16 and carry track rails 20. The forward ends of the channels 17 are connected to the uprights 13 by brace bars 22.

The rear ends of the channels 17 and their track rails 18 are extended or inclined downwardly as shown at 17a. Extensions at the rear ends of the channels 19 and their track rails 20 are inclined upwardly as shown at 19a, while the forward ends of the channels 19 are connected to the uprights 13. Horizontal channel portions 23 are provided above the channel sections 19 and 19a at each side of the machine, these channel portions carry guide rails 25, as shown more clearly in Figs. 4 and 5, to hold down the rollers 38 of upper chain link pintles 37 when the rollers are moving along the channels 23 and the adjacent portions of the track rails 20. The channels 23 are carried by cross bars 27 that are slidably supported on guide bolts or studs 28, the bars 27 being vertically-supported by adjusting screws 29 that have threaded engagement with the bars and rest upon plates 30 that, in turn, are secured to the channels 19. The studs 28 loosely extend through the plates 30 and are provided with nuts 31 on their lower ends to limit upward movement with respect to the channels 19. Springs 32 yieldably resist upward movement of the cross bars 27 when the guide rails 25 and their channels 23 are lifted by the rollers 38.

Upper and lower chain-like members are provided for bending the glass sheets to crenelated form. The lower chain is movable along the track rails 18 and comprises a series of ribs or presser bars 33 extending crosswise between the channels 17—17a. The bending members 33 are hingedly connected by pintles 34 that have rollers 35 mounted on their ends for travel along the track rails 18. The members 33 will be drawn upwardly along the inclined portions of these track rails and thence along their horizontal reaches and thereafter drawn backwardly to the position shown in Fig. 1, in a manner to be hereinafter described.

Similarly, the upper presser members 36 are connected by the pintles 37 that have the rollers 38 on their ends for riding along track rails from approximately the rear ends to the forward ends of said rails, the rollers, when in the horizontal portion of their path at 23, being yieldably held down against the rails 20 by the springs 32 acting through the rail 25. This upper chain of elements 36 is likewise moved back and forth, in synchronism with the members 33.

A motor 39 of the reversible type is provided for driving the chains. Transmission of power is effected through a gear reduction unit 40 that drives a sprocket 41 and a chain 42. The chain passes around a sprocket 43 mounted on a shaft that carries a sprocket 44 around which passes a chain 45. The lower end of this chain is secured to the front end of the conveyor or chain-like elements 36, and the other end is connected to a turn-buckle 46 which in turn has connection through a wire cable 47 with the rear end of the chain structure 36—36. The cable 47 passes around a guide pulley 48 that is journaled on a cross bar 49 which connects the rear ends of the rail 19a. When the sprocket 43 is driven by the motor in a counterclockwise direction, the chain elements 36—36 will be drawn backwardly to the position shown in Fig. 1. When the motor is driven in a direction to rotate the sprocket 43 in a clockwise direction, the chain-like presser members 36 will be drawn past the pressure zone at 23 to shape a glass sheet in a manner to be hereinafter described. A guide pulley 50 is provided for engagement by the cable 47 when the members 36 are being drawn to their foremost positions.

The chain 42 passes around an idler guide sprocket 51 and over a sprocket 52 so that the shaft to which the sprocket 52 is attached is driven in a direction opposite to that in which the sprocket 43 is being driven at any given time. The shaft which carries the sprocket 52 has secured thereto a sprocket wheel 54 around which a chain 55 extends. One end of the chain is connected to the forward end of the conveyor-like structure formed by the hingedly connected presser members 33 and the other end is connected to a turn-buckle 56 which, in turn, has connection through the rope 57 with the rear end of the members 33, the rope passing around a guide pulley 58 that is journaled on a cross bar 59 which connects the rear ends of the channels 17a.

A guide sheave 60a is provided for the wire rope 57, and a guide pulley 60 for the rear portion of the rope, when the members are at their foremost position.

In Fig. 5 is shown means for insuring that each set of ribs will be in properly offset relation to the ribs of the opposite set, in a direction longitudinally of the machine, when the glass sheet is being first engaged. This means is shown as a groove 61 on the leading rib 33 in position to be engaged by a bead 62 on the leading rib 36. This arrangement avoids excessive local pressures on the sheet.

When the motor 39 is driven in a direction to move the sprocket wheel 43 clockwise and the sprocket 54 counterclockwise, the forming elements 33—33 and 36—36 will be drawn forwardly in the machine. As this forward movement begins, a sheet of heat-softened glass 63 will be moved along rollers on a table 64. Provision is shown at 65 for the application of heating flames to the plate 63 in case it is not sufficiently soft for bending to crenelated form. When the glass plate is engaged by the foremost presser members 33—36, it will be drawn forward along with the chains and progressively bent to crenelated contour or other desired contours, depending upon the shape and arrangement of the bending members 33 and 36.

The guide rails 25 serve to direct the elements 36 into a position to snugly bend and press the glass sheet into the spaces between the crenel-forming members 33, although the springs 32 will allow the rails to yield in an upward direction when the thrusts on the glass becomes excessive.

The temperature of the glass sheet may suitably be about 1500° F. although this may be varied somewhat, depending upon the composition and thickness of the glass. As here shown, the presser ribs 36 come opposite to the hinged joints at 34, and similarly, the presser ribs 33 come opposite to the hinged joints at 37 when the presser members are brought into co-operative relation to shape the glass. By reason of the angularity of approach of the two sets of presser members toward the horizontal plane of operation and the said locations of the hinged joints, the flat surface of each rib 33 or 36 moves with the glass sheet and presses it into final shape, with no substantial sliding movement on the glass or stretching of it, and completes the shaping of the crenel before the next succeeding bending rib engages the glass. Furthermore, during the pressing of the glass, there is wide-faced engagement of the ribs with the glass, so that this broad surface engagement during pressing of the crenels results in a minimum of localized pressure along transversely-extending lines on the surface of the glass. This method of operation also reduces danger of cracks such as would be formed by excessive local chilling along said transverse lines. When the presser members 36 have passed up the channel guide 19, out of engagement with the pressed glass, the crenelated glass 63a will be slid sidewise from the machine, into an annealing oven or on to a conveyor.

Usually the sheets 63 will be of much greater dimension in directions transversely of their path of travel through the machine than in directions transversely of the bends, so that panels will be formed that are of much greater length in a direction parallel to the crenels than in the other direction. Also, wire mesh may be imbedded in the sheet 63 before it enters the machine, when reinforced glass is required.

The ribs need not be all of the same shape and dimensions. For example, as shown in Fig. 7, the sheets at their edges may be shaped as shown at 67 and the edge portions 67 of each sheet can be partly cut off and connected in a roof or side wall as shown in Fig. 9, by a cap strip 68, bolts 69 and washers 70. The narrower, curved contour of such flanges or half ribs 67 permit the forming of a joint that is less liable to the leakage of rain therethrough than if relatively wider flat surfaces and a flat cap strip were used. The flat edge portions of the extensions 67 serve to support the edge of the sheet, while it is in a plastic condition and during annealing, against sagging such as might occur if the sheet were initially shaped as in Fig. 9 and its edges unsupported.

In addition to forming the short curved bends or flanges 67 at the edges of the sheet, an intermediate rib 71 can be formed in the sheet which can be cut along its median line, to form two flange elements 67, so that when a full width sheet is not required to complete a roof, another sheet may be split at 71 and only one-half thereof used to fill in the vacant space. Again, by making some of the ribs 67 or 71 of lesser height than the crenel-shaped ribs or channel, a better joint can be secured, in that with flanges or ribs 67 of low height, their upper edges will be closer to the neutral axis of the sheets and therefore not subject to bending stresses that would tend to loosen the joint.

I claim as my invention:

1. Apparatus for shaping sheets of plastic material, comprising upper and lower guide rails that are in parallelism at their mid portions and having their end portions relatively flared, a set of bending ribs movable on each of the guide rails, means hingedly connecting the ribs of each set in chain-like arrangement and in staggered relation to the ribs of the other set, in directions generally parallel to the path of travel of sheets through the apparatus, the sets of ribs being so positioned with respect to each other that the ribs of each set will be moved between the ribs of the other set while the two sets of ribs are entering the said parallel portions of the guide rails, to thereby bend a sheet, and means for imparting reciprocating movements to said set of ribs, longitudinally of the rails, to move them into and out of co-operative relation at the said parallel portions of the guide rails.

2. Apparatus for shaping sheets of plastic material, comprising upper and lower guide rails that are in parallelism at their mid portions and having their end portions relatively flared, a set of bending ribs movable on each of the guide rails, means hingedly connecting the ribs on each set in chain-like arrangement and in staggered relation to the ribs of the other set, in directions generally parallel to the path of travel of sheets through the aparatus, the sets of ribs being so positioned with respect to each other that the ribs of each set will be moved between the ribs of the other set while the two sets of ribs are entering the said parallel portions of the guide rails, to thereby bend a sheet, and means for imparting reciprocating movements to said set of ribs, longitudinally of the guide rails, to move them into and out of co-operative relation at the said parallel portions of the rails, the said means comprising reversible driving mechanism having connections with the opposite ends of each of the sets of ribs.

3. Apparatus for shaping sheets of plastic material, comprising upper and lower guide rails that are in parallelism at their mid portions and having their end portions relatively flared, a set of bending ribs movable on each of the guide rails, means hingedly connecting the ribs of each set in chain-like arrangement and in staggered relation to the ribs of the other set, in directions generally parallel to the path of travel of sheets through the apparatus, the sets of ribs being so positioned with respect to each other that the ribs of each set will be moved between the ribs of the other set while the two sets of ribs are entering the said parallel portions of the guide rails, to thereby bend a sheet, means for imparting reciprocating movements to said sets of ribs, longitudinally of the rails, to move them into and out of co-operative relation at the said parallel portions of the guide rails, and aligning means on the forward bending ribs of the two sets, positioned to aline the median line of one forward rib with the foremost edge of the forward rib of the other set, and comprising a bead on one rib that coacts with a groove on the other rib.

JOHN M. McCORMICK.

REFERENCES CITED

The following references are of record in the file of this patent:

UNITED STATES PATENTS

| Number | Name | Date |
|---|---|---|
| 798,645 | Wadsworth | Sept. 5, 1905 |
| 2,350,996 | Atkinson et al. | June 13, 1944 |

FOREIGN PATENTS

| Number | Country | Date |
|---|---|---|
| 623,124 | Germany | Dec. 13, 1935 |